Oct. 28, 1952  B. H. SHORT ET AL  2,616,073
GENERATOR REGULATOR
Filed Feb. 19, 1949
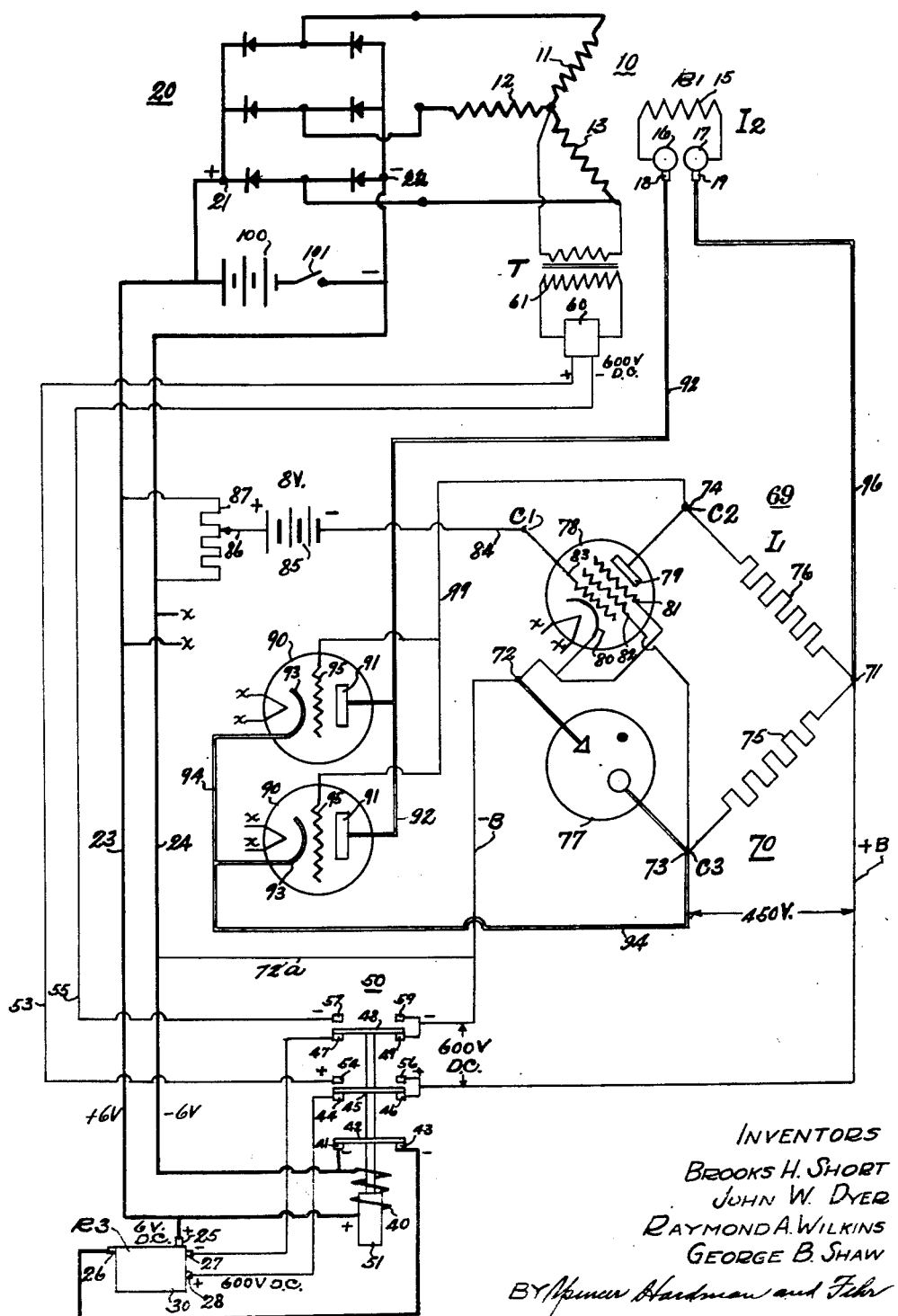
INVENTORS
BROOKS H. SHORT
JOHN W. DYER
RAYMOND A. WILKINS
GEORGE B. SHAW
BY Spencer Hardman and Fehr
THEIR ATTORNEYS Patented Oct. 28, 1952

2,616,073

UNITED STATES PATENT OFFICE 2,616,073

GENERATOR REGULATOR

Brooks H. Short, Raymond A. Wilkins, and George B. Shaw, Anderson, and John W. Dyer, Pendleton, Ind., assignors to General Motors Corporation, Detroit, Mich., a corporation of Delaware Application February 19, 1949, Serial No. 77,412

1 Claim. (Cl. 322—28)

This invention relates to an electric current generating system for use on automotive vehicles and comprising an A. C. generator driven by the vehicle propelling engine and connected with a rectifier which puts out current for charging a storage battery and for other purposes. Heretofore, in systems of this type, the field current for the generator is provided by the rectifier at voltage which is relatively low, for example that required for charging a 12-volt storage battery. Since field voltage is low, the field winding is made of relatively heavy wire. The field winding, therefore, occupies considerable space.

An object of the invention is to effect field excitation with a field winding which occupies less space than in the case of the generator referred to and to provide for field current regulation by the use of a thermionic tube available on the market. To do this, we provide for field excitation by a relatively high voltage source so that, by using a field coil having a sufficient number of turns of relatively fine wire, adequate field excitation can be effected with relatively low field current and an available thermionic tube can handle this relatively low current. For controlling the conductivity of the tube we provide control of its grid bias through means which senses the relation between a voltage derived from the rectifier output terminal and the voltage of a standard D. C. voltage source.

Further objects and advantages of the present invention will be apparent from the following description, reference being had to the accompanying drawing, wherein a preferred embodiment of the present invention is clearly shown.

In the drawing:

The figure is a wiring diagram of the invention.

Referring to the figure, a generator 10, having a fixed stator comprising coils 11, 12 and 13, has a rotating field excited by a coil 15 driven by a variable speed power source such as the engine of an automotive vehicle. The ends of coil 15 are connected with slip rings 16 and 17 engaged by brushes 18 and 19 respectively. A rectifier 20 is connected with coils 11, 12 and 13 for A. C. input and with terminals 21 and 22 for D. C. output. Wires 23 and 24 are connected with terminals 21 and 22 respectively and normally with the input terminals 25 and 26 of a D. C. transformer or power pack 30 through normally engaged switch contacts 41, 42, 43. Power pack 30 has output terminals 28 and 27 normally connected by normally engaged switch contacts 44, 45, 46 and 47, 48, 49, respectively, with wires +B and —B, respectively, whose potential difference is, for example, 600 volts D. C. The contacts 41—49 are part of a relay switch 50 having a magnet coil 40 connected with wires 23 and 24 and an armature 51 which is lifted by magnetic pull effected by coil 40 when the generator output voltage rises to a certain value corresponding to a certain engine speed. The rise of armature 51 interrupts the input and output circuits of the power pack 30 and connects through closed contacts 54, 45, 56 and closed contacts 57, 48, 59, the wires +B and —B with wires 53 and 55, respectively, connected with the output terminals of a second power pack 60 whose input terminals are connected with the secondary winding 61 of a transformer T having a primary winding connected with stator coil 13. Pack 60 puts out 600 volts D. C.

Wire +B connects contacts 46, 56 with a terminal 71. Wire —B connects contacts 49, 59 with a terminal 72. Terminals 71 and 72 are, respectively, the most positive and most negative ends of two potentiometers or voltage dividers 69 and 70. Divider 69 includes a fixed resistance 76, a junction 74 and a pentode tube 78. Divider 70 includes a fixed resistance 75, a junction 73 and a voltage control tube 77 which causes the voltage between junction 73 and terminal 72 to be fixed at 150 volts, for example, for a purpose to be described.

Plate 79 and cathode 80 of tube 78 are connected, respectively, with terminals 74 and 72. Its stabilizing grids 81 and 82 are connected, respectively, with terminals 72 and 73. Its control grid 83 is connected with a grid biasing control circuit senses the relation between generator output voltage and the voltage of a standard D. C. voltage source. This circuit comprises grid 83, wire 84, fixed potential D. C. source 85 and a potentiometer comprising a rheostat wiper 86 and resistance 87 connected with wires 23 and 24. Wire 24 is connected by wire 72a, wire —B and terminal 72 with cathode 80 which therefore has a fixed negative potential.

The circuit of the field coil 15, indicated by fine parallel lines, comprises triode tubes 90 in parallel and having their plates 91 connected by wire 92 with brush 18 and having their cathodes 93 connected by wire 94 with terminal 73. Terminal 71 is connected by wire 96 with brush 19. The tube 77 maintains cathodes 93 at 150 volts above the most negative terminal 72.

The grids 95 of tubes 90 are connected by wire 99 with terminal 74 whose potential varies in accordance with the conductivity of tube 78 which senses the change in the relation of rectifier output voltage to the voltage of the standard or fixed D. C. voltage source 85.

Let C1 represent the potential of grid 83, C2 the potential of terminal 74 and C3 the potential of terminal 73 and cathodes 93 which is fixed. Assume that the generator voltage output is to be held at a value such that voltage at the wiper 86 is 6 volts D. C. C1 will be —2 volts since source 85 provides —8 volts at wire 84. When grid 83 has —2 volts bias, C2 has a value such that tubes 90, whose plate potential is around 450 volts, will pass current I2 to field coil 15 of a value such that generator output voltage causes the potential of wiper 86 to be 6 volts D. C. When, due to increase in speed, the potential of wiper 86 increases to 6.5 volts, for example, potential C1 is —1.5 volts and hence has become more positive. Tube 78 is more conducting, $I_1$ (current in resistance 76) increases and potential C2 decreases positively relative to C3, the potential of cathodes 93. Therefore bias on grids 95 has increased negatively and tubes 90 are less conducting and I2 decreases to lower field excitation to a value such that the generator, when operating at increased speed, will not cause the voltage at wiper 86 to be more than 6 volts D. C. When, due to decrease in speed, the voltage at wiper 86 decreases to 5.5 volts, for example, potential C1 is —2.5 volts. Tube 78 is less conducting, $I_1$ decreases and potential C2 increases positively relative to C3, the potential of cathodes 93, and the bias on grid 95 increases positively and tubes 90 pass more current so that the generator voltage is such that, at lower generator speed, the voltage at wiper 86 is 6 volts D. C.

As the tube 77 must be kept in operation regardless of decrease of field current to a low value at high generator speed, the resistance 75 which by-passes the field winding 15 passes sufficient current to the tube 77 to maintain its operation.

Storage battery 100 is connected by a manual operated switch 101. Battery 100 operates in conjunction with the power pack 30 initially to provide the current source for field excitation so that the generator output will reach 6 volts D. C. at relatively low engine speed. Then the relay switch 50 operates to change the connections with wires +B and —B from the power pack 30 to the power pack 60 operated by the generator and operating to put out 600 volts D. C. at all generator speeds above the speed at which the relay switch 50 cuts in the pack 60.

When the engine is idling as frequently happens in city delivery service, the idle speed voltage of generator coil 13 will be sufficient for operation of the pack 60 to provide 600 volts D. C. in order to maintain 6 volts D. C. output at idle speed. Although output voltage might happen to decrease slightly below 6 volts, the energization of coil 40 of relay 50 will be sufficient to hold armature 51 up so that the circuit between the pack 60 and wires +B and —B is maintained. In this way charging of the battery 100 continues at idle speed. When battery 100 is fully charged, it merely floats on the line.

While the embodiment of the present invention as herein disclosed, constitutes a preferred form, it is to be understood that other forms might be adopted.

What is claimed is as follows:

An electric current generating system for use on automotive vehicles and comprising an A. C. generator driven at different speeds by the vehicle propelling engine, a rectifier connected with the generator for supplying direct current to a storage battery and other purposes, a D. C. source of relatively high voltage for supplying generator field excitation current, said generator having a field winding of sufficient number of turns of relatively fine wire whereby required field excitation can be effected with relatively low current, a first voltage divider connected across the terminals of field exciting D. C. source and comprising, in series, a resistance connected with the positive terminal of said D. C. source, a junction and a thermionic tube whose plate is connected with the junction and whose cathode is connected with the negative terminal of said D. C. source, a connection between the negative terminal of the rectifier and said cathode to maintain it at a fixed negative potential, a second voltage divider connected with the terminals of the field exciting D. C. source and comprising, in series, a resistance connected with the positive terminal of said D. C. source, a junction and a voltage control tube which maintains a constant voltage drop between the junction in the second voltage divider and the negative terminal of said D. C. source, a field excitation circuit including the positive terminal of said D. C. source, the generator field coil, a second thermionic tube whose plate is connected to the field coil and whose cathode is connected to the junction in the second voltage divider, the voltage control tube and the negative terminal of said D. C. source, a connection between the grid of the second thermionic tube and the junction in the first voltage divider, a potentiometer connected with the rectifier terminal and a fixed potential D. C. source of relatively low voltage whose positive terminal is connected with the potentiometer and whose negative terminal is connected with the grid of the first mentioned thermionic tubes whereby the conductivity of the first thermionic tube is responsive to the relation between rectifier D. C. terminal voltage and the voltage of the second mentioned D. C. source, whereby the potential at the junction in the first voltage divider accordingly varies to vary the grid bias on the second thermionic tube, and whereby the conductivity of the latter tube varies to change field current to correct for deviations of rectifier output voltage from a certain value.

BROOKS H. SHORT.
RAYMOND A. WILKINS.
GEORGE B. SHAW.
JOHN W. DYER.

REFERENCES CITED

The following references are of record in the file of this patent:

UNITED STATES PATENTS

| Number | Name | Date |
|---|---|---|
| 2,209,232 | Moyer | July 23, 1940 |
| 2,220,755 | Edwards | Nov. 5, 1940 |
| 2,251,683 | Logan | Aug. 5, 1941 |
| 2,262,359 | Exner | Nov. 11, 1941 |

OTHER REFERENCES

A. P. C. application of Basili, Serial No. 287,174, published May 18, 1943.